United States Patent
Coulmeau et al.

(10) Patent No.: US 8,630,754 B2
(45) Date of Patent: Jan. 14, 2014

(54) METHOD FOR REPLACING LEGS IN AN AIR NAVIGATION PROCEDURE

(75) Inventors: François Coulmeau, Seilh (FR); François Hoofd, Toulouse (FR)

(73) Assignee: Thales, Neuilly sur Seine (FR)

( * ) Notice: Subject to any disclaimer, the term of this patent is extended or adjusted under 35 U.S.C. 154(b) by 1439 days.

(21) Appl. No.: 11/951,197

(22) Filed: Dec. 5, 2007

(65) Prior Publication Data

US 2008/0177431 A1  Jul. 24, 2008

(30) Foreign Application Priority Data

Dec. 5, 2006 (FR) .................................. 06 10603

(51) Int. Cl.
*G06F 19/00* (2011.01)
*G06G 7/70* (2006.01)

(52) U.S. Cl.
USPC .............. 701/15; 701/1; 701/3; 701/4; 701/5; 701/6; 701/9; 701/11; 701/16; 701/17; 701/18

(58) Field of Classification Search
None
See application file for complete search history.

(56) References Cited

U.S. PATENT DOCUMENTS

| | | | | |
|---|---|---|---|---|
| 4,086,632 A | * | 4/1978 | Lions | 701/210 |
| 4,642,775 A | * | 2/1987 | Cline et al. | 701/200 |
| 4,692,869 A | * | 9/1987 | King et al. | 701/206 |
| 4,812,990 A | * | 3/1989 | Adams et al. | 701/3 |
| 4,827,419 A | * | 5/1989 | Selby, III | 701/200 |
| 5,047,946 A | * | 9/1991 | King et al. | 701/206 |
| 5,216,611 A | * | 6/1993 | McElreath | 701/221 |
| 5,340,061 A | * | 8/1994 | Vaquier et al. | 244/175 |
| 5,463,554 A | * | 10/1995 | Araki et al. | 701/211 |
| 5,646,854 A | * | 7/1997 | Bevan | 701/206 |
| 5,752,217 A | | 5/1998 | Ishizaki et al. | |
| 5,797,106 A | * | 8/1998 | Murray et al. | 701/11 |
| 6,085,129 A | * | 7/2000 | Schardt et al. | 701/14 |
| 6,134,500 A | * | 10/2000 | Tang et al. | 701/202 |
| 6,148,179 A | * | 11/2000 | Wright et al. | 455/66.1 |
| 6,163,744 A | * | 12/2000 | Onken et al. | 701/3 |
| 6,216,065 B1 | * | 4/2001 | Hall et al. | 701/16 |
| 6,259,988 B1 | * | 7/2001 | Galkowski et al. | 701/202 |
| 6,314,362 B1 | * | 11/2001 | Erzberger et al. | 701/120 |
| 6,353,734 B1 | * | 3/2002 | Wright et al. | 455/98 |
| 6,405,124 B1 | | 6/2002 | Hutton | |
| 6,522,958 B1 | * | 2/2003 | Dwyer et al. | 701/3 |
| 6,618,652 B2 | * | 9/2003 | Lafon et al. | 701/3 |
| 6,633,810 B1 | * | 10/2003 | Qureshi et al. | 701/206 |
| 6,664,945 B1 | * | 12/2003 | Gyde et al. | 345/156 |
| 6,922,631 B1 | * | 7/2005 | Dwyer et al. | 701/206 |
| 7,003,383 B2 | * | 2/2006 | Rumbo et al. | 701/3 |

(Continued)

FOREIGN PATENT DOCUMENTS

EP    1598641 A1    11/2005

*Primary Examiner* — Bhavesh V Amin
(74) *Attorney, Agent, or Firm* — Lowe Hauptman & Ham, LLP

(57) ABSTRACT

The present invention relates to a method for replacing legs in an air navigation procedure described as a series of legs, the legs forming part of an initial family of legs. The method includes: a step of determining a restricted family of legs included in the initial family of legs, so that each leg not belonging to the restricted family corresponds to a combination of legs belonging to the restricted family: The method also includes: a step of replacing in the navigation procedure the legs not belonging to the restricted family with combinations of legs belonging to the restricted family.

17 Claims, 3 Drawing Sheets

(56) References Cited

U.S. PATENT DOCUMENTS

| | | | |
|---|---|---|---|
| 7,050,905 B2 * | 5/2006 | Nemeth | 701/201 |
| 7,698,027 B2 * | 4/2010 | Caillaud | 701/14 |
| 7,904,213 B2 * | 3/2011 | Coulmeau | 701/3 |
| 2007/0027588 A1 * | 2/2007 | Astruc et al. | 701/3 |

* cited by examiner

METHOD FOR REPLACING LEGS IN AN AIR NAVIGATION PROCEDURE

RELATED APPLICATIONS

The present application is based on, and claims priority from, French Application Number 06 10603, filed Dec. 5, 2006, the disclosure of which is hereby incorporated by reference herein in its entirety.

FIELD OF THE INVENTION

The present invention relates to a method for replacing legs in an air navigation procedure described as an ordered series of legs. It applies notably in the field of avionics.

BACKGROUND OF THE INVENTION

A flight plan is the detailed description of the route to be followed by an aircraft within the framework of a planned flight. It comprises notably a chronological sequence of waypoints described by their position, their altitude and their overflight time. The waypoints constitute the reference trajectory to be followed by the aircraft with a view to best complying with its flight plan. This trajectory is a valuable aid both to the ground control personnel and also to the pilot, for anticipating the movements of the airplane and thus ensuring an optimum safety level, notably within the framework of maintaining the separation criteria between aircraft. The flight plan is commonly managed aboard civil airplanes by a system designated by the terminology "Flight Management System", that will be called the FMS subsequently, which makes the reference trajectory available to the flight personnel and available to the other onboard systems. Essentially with a view to safety, it is therefore necessary to ensure that the airplane follows at least in geographical terms the reference trajectory described in the flight plan, so as notably to maintain the separation distances between aircraft.

With this aim, State organizations and airport authorities have for a very long time been for example obligated in the publication of takeoff and landing procedures. These procedures have for a long time been published in paper form only, according to graphical and textual formalisms. They guarantee the safety of outbound or inbound flights at aerodromes. Subsequently, they are simply designated by the term "published procedures". But with the advent in avionics of flight management systems like FMS and of navigation and landing units known by the terminology "Global Navigation and Landing Unit" (GNLU), the procedures published in paper form have been found to be unsuitable, or indeed totally outmoded. The necessity to manage in a digital format all the procedures published by State organizations has become apparent.

Currently, the published procedures are provided to various providers of navigation databases by specialized organizations of the states belonging to the International Civil Aviation Organization (ICAO). The textual and graphical formalisms used are defined by the ICAO, but sometimes they are poorly complied with by State organizations. The best known providers are Jeppesen and LIDO. The providers transform the textual descriptions into series of "legs", to use the terminology by which they are known in the aeronautics business. A "leg" corresponds to a trajectory portion defined by several parameters, such as for example instructions to be followed in terms of position, altitude, heading or course. Subsequently in the present application, the terminology "legs" could be replaced with the terminology "legs", it being understood that this substitution is of interest only for translation purposes and that an English version of the present application ought preferably to preserve the original term of "leg". In any event, the term "legleg" must not here be limitative to straight line leglegs, it can also designate curvilinear legs or combinations of straight line legs and curvilinear legs. The series of "legs" or of "legs" are provided in a digital format, the providers being relatively free in their interpretation of the published procedures as series of legs. The databases thus produced by the providers are called navigation databases. An important principle in the production of navigation databases is the non-corruption of the data. This involves ensuring that the digitization method does not alter the published procedure, each series of legs having to be the faithful reflection of a procedure published by a State organization.

Standardization rules are described for civil aviation in a standard known by the acronym ARINC 424. An aim of the ARINC 424 standard is to normalize the process for producing the navigation databases by the various providers, so as to limit the divergences between the navigation databases arising from different providers. The ARINC 424 standard defines notably a set of 23 legs and it also defines all the combinatorics for chaining these legs together, excluding notably certain chains. The legs currently defined in the ARINC 424 standard are enumerated in the table below.

ARINC 424 Legs

| Leg | ARINC 424 Name | Meaning |
|---|---|---|
| IF | Initial Fix | Fixed initial point on the ground |
| CF | Course To a Fix | Joining/Following of a ground course up to a fixed point |
| DF | Direct to a Fix | Direct joining (right) of a fixed point |
| TF | Track between two Fixes | Great-circle route between 2 fixed points |
| AF | Arc DME to a Fix | Defines a circular arc about a specified remote DME beacon, with an aperture limit. |
| RF | Radius to a Fix | Defines a circular arc between 2 fixed points (the 1st point being the fixed point of the previous leg), on a centre of the fixed circle. |
| VI | Heading to Intercept | Defines a heading to be followed up to interception of the next leg |
| CI | Course to Intercept | Defines a course to be followed up to interception of the next leg |
| VA | Heading to Altitude | Defines a heading to be followed up to a given altitude |
| CA | Course to Altitude | Defines a course to be followed up to a given altitude |
| FA | Fix to Altitude | Defines a course to be followed, starting from a fixed point, up to a given altitude |
| VD | Heading to DME Distance | Defines a heading to be followed up to interception of a specified DME arc |

-continued

ARINC 424 Legs

| Leg | ARINC 424 Name | Meaning |
| --- | --- | --- |
| CD | Course to DME Distance | Defines a course to be followed up to interception of a specified DME arc |
| VR | Heading to Radial | Defines a heading to be followed up to interception of a specified radial |
| CR | Course to Radial | Defines a course to be followed up to interception of a specified radial |
| FC | Track from Fix to Distance | Defines a course to be followed starting from a fixed point, over a specified distance |
| FD | Track from Fix to DME Distance | Defines a course to be followed starting from a fixed point, until it intercepts a DME arc (specified DME distance) |
| VM | Heading to Manual | Defines a heading without termination (infinite half line) |
| FM | Fix to Manual | Defines a course, starting from a fixed point, without termination (infinite half line) |
| HA | Hippodrome to Altitude Termination | Aerodrome circuit, with Altitude exit condition |
| HF | Hippodrome to Fix Termination | Aerodrome circuit, with a single lap |
| HM | Hippodrome to Manual Termination | Manual aerodrome circuit, without exit condition |
| PI | Fix to Manual | Separation procedure defined by an outbound course starting from a fixed point, followed by a U-turn, and interception of the initial separation course for the return. |

Thus, the ARINC 424 standard defines 8 types of so-called "fixed" legs, whose commencement or termination is a fixed waypoint on land, published as latitude and longitude. These are the legs of types IF, CF, DF, TF, AF, RF, FC, FD. The ARINC 424 standard also defines 11 types of so-called "floating" legs whose termination consists of the realization of a variable condition, such as for example legs which terminate when the airplane has attained a certain altitude. These are the legs of types VA, CA, FA, VI, CI, VD, CD, VR, CR, VM, FM. The ARINC 424 standard also defines 3 types of so-called "holding procedure" legs which correspond to aerodrome circuits. These are the legs of types HM, HA, HF. Finally, the ARINC 424 standard defines a type of so-called "course reversal" legs which corresponds to an outbound course followed by a return procedure. These are the legs of type PI.

To manage a trajectory using published procedures, current FMS must therefore manage the 23 legs of the ARINC 424 standard enumerated in the above table, as well as implement the chaining together of any pair of legs from among the 23, that is to say be capable of calculating a trajectory chaining the 2 legs together. This combinatorial is also defined in the ARINC 424 standard, which is restrictive in the sense that certain leg chainings are forbidden. By considering only the 2 by 2 combinations, out of 23×23=529 possible combinations, about 360 are permitted in the current ARINC 424 standard. Thus, certain procedures published by State organizations are not embedded in FMS since they cannot be represented on the basis of the ARINC 424 standard.

A technical problem posed relates to the geographical dispersion of the trajectories generated by different systems on the basis of one and the same published procedure. Specifically, the very large number of procedures published by State organizations, the non strict compliance with the directives of the ICAO by State organizations in textually describing the procedures that they publish, the relative freedom of the navigation database providers in interpreting the published procedures, the large number of floating legs used, but also the algorithmic divergences between the systems like FMS calculating the leg chaining trajectories, induce lateral position deviations which may be very sizable between the trajectories generated by different systems on the basis of one and the same published procedure. Two aircraft can therefore theoretically follow the same published procedure, but not follow the same trajectory in practice. This poses a major safety problem.

Another technical problem posed relates to the validation of the systems managing the published procedures. For example, the development and validation of FMS is complex and expensive. Specifically, it is difficult to ensure exhaustive coverage of all derived cases as there are already 360 basic cases. A veritable combinatorial explosion occurs and it becomes complicated to certify that all possible cases have been tested.

To attempt to remedy this, the RTCA ("Radio Technical Commission for Aeronautics"), which takes on notably advisory functions at the international level in the field of air traffic management, has issued a directive aimed at decreasing the geographical dispersion phenomenon. This is directive DO236B. Among other recommendations, directive DO236B advocates the use of a restricted family of legs, namely the 9 legs out of the 23 legs of the ARINC 424 standard which are the least liable to divergent interpretations. These are the 5 fixed legs IF, CF, DF, TF, RF, the floating leg FA, and the 3 holding procedure legs HA, HF and HM. But the directive will only be applied by State organizations, and then by the providers of navigation databases, for about 10% of the published procedures, namely the published procedures that are required to be described with less ambiguity and more precision, for safety reasons or for better management of the airport zone for example. For these new published procedures, the 9 legs of directive DO236B will suffice. As regards the majority of published procedures, they will not be reconsidered by State organizations, because their current precision is sufficient in relation to the local operational context. Database providers will therefore not be able to apply the recommendations of directive DO236B to them, since they are not compatible therewith. For this reason, it will still be necessary to use the 23 ARINC 424 legs. Thus, directive DO236B partially achieves its aim, by virtue of the cooperation of State organizations in the case of the published procedures that they consider at risk. But directive DO236B fails in the case of the more normal published procedures and the phenomenon of geographical dispersion of different systems for one and the same published procedure has therefore not disappeared.

SUMMARY OF THE INVENTION

The aim of the invention is notably to reduce the combinatorics upstream of the systems having to manage published procedures, doing so while complying with the purpose of the procedures published by State organizations. By improving the determinism in the path of the lateral trajectories with respect to the ground, it makes it possible for example to improve the robustness of FMS. For this purpose, the subject of the invention is a method for replacing legs in an air navigation procedure described as a series of legs, the legs forming part of an initial family of legs. The method comprises a step of determining a restricted family of legs included in the initial family of legs, so that each leg not belonging to the restricted family corresponds to a combination of legs belonging to the restricted family. The method also comprises a step of replacing in the navigation procedure the legs not belonging to the restricted family with combinations of legs belonging to the restricted family.

Advantageously, among the legs belonging to the initial family of legs which do not belong to the restricted family of legs, at least one leg can be a floating leg.

For example, the navigation procedure can be a takeoff procedure or a landing procedure described by using the legs complying with the ARINC 424 standard. The restricted family of legs can then contain a maximum of 10 legs, such as for example the legs complying with directive DO236B or else the leg FM.

Advantageously, the method can be implemented aboard an aircraft in the form of a translation machine in a flight management system or it can be implemented on the ground in the form of a translation machine in a traffic management system.

The main advantages of the invention are moreover that it affords more significant determinism in systems that implement management of published procedures, which is manifested in a practical manner by greater repeatability of the results obtained between aircraft and between ground centers. The invention also simplifies the development, fine tuning and validation of systems that implement management of the published procedures, for example the software embedded in FMS, by decreasing the number of combinations to be tested. The systems that implement management of published procedures are also more robust, since the reduction in the number of cases processed decreases, mechanically, the risks of encountering in-flight problems.

Other characteristics and advantages of the invention will become apparent with the aid of the description which follows offered in relation to appended drawings which represent:

DETAILED DESCRIPTION OF THE DRAWING

Figure 1:
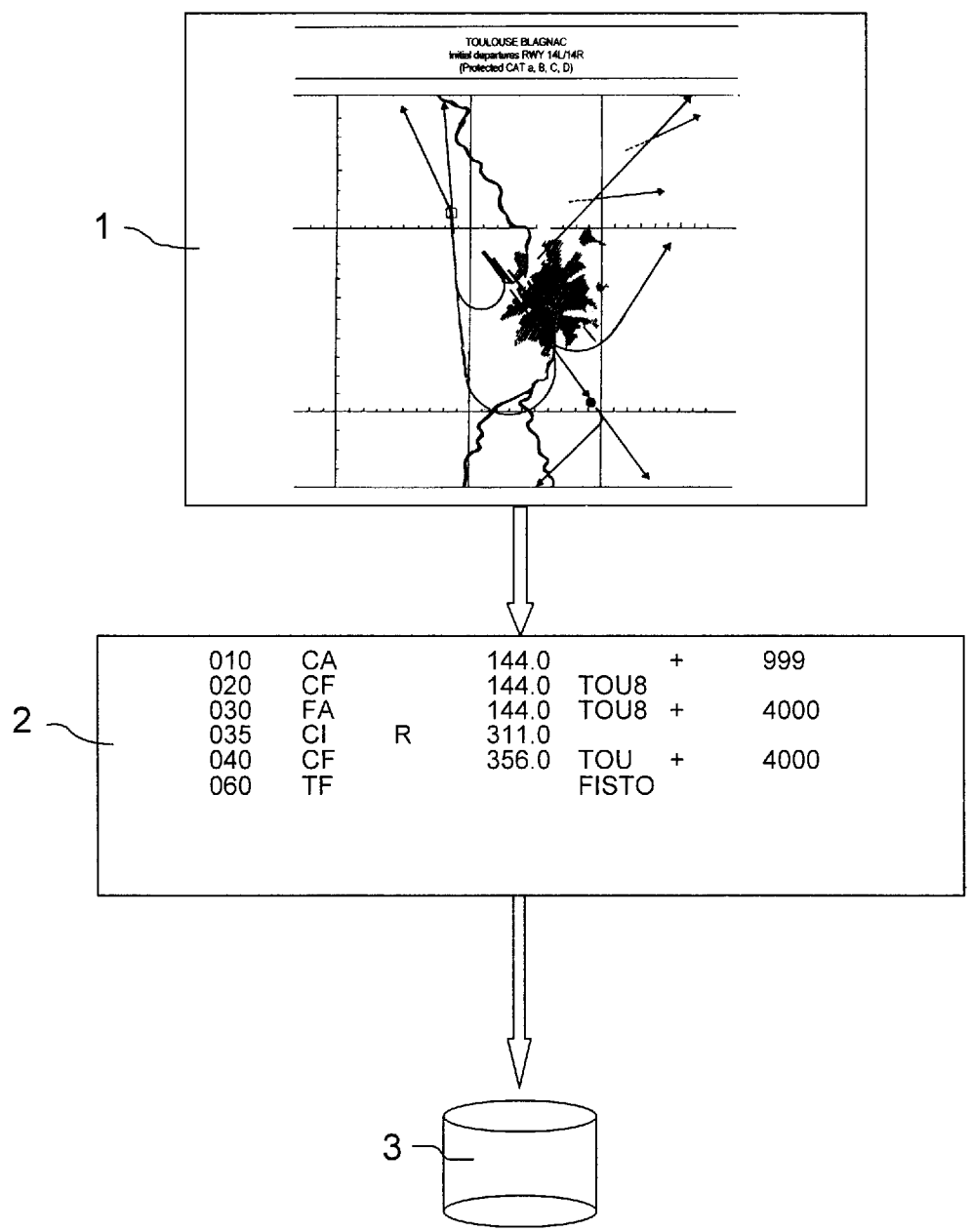
FIG. 1, by a chart, an exemplary conventional processing chain for a published procedure.

FIG. 1 illustrates by a chart an exemplary conventional processing chain for a published procedure.

A document 1 published in paper form by a French organization called the "Service de l'Information Aéronautique" (SIA) is represented. It describes a takeoff procedure for Toulouse-Blagnac airport, on departure from runway 14R, SID FIST5A. Document 1 comprises in its top part a graphical description of the takeoff procedure, superimposed on cartographic data of the zone of Toulouse-Blagnac airport.

Document 1 also comprises in its bottom part a textual description of the takeoff procedure, which gives the following instructions: "After takeoff, follow RDL144 (RM144) and climb to the assigned level. At 4000 AMSL minimum and not before 8 NM TOU, turn right to intercept and follow RDL176 (RM356) as far as TOU. At TOU, follow RDL356 (RM356) as far as FISTO (47NM TOU)". The description, at one and the same time graphical and textual, provided by document 1 does not comply with any very precise standard. It can only be utilized by a human being capable of understanding a text written in French. Moreover, this description remains relatively evasive regarding certain courses to be followed and gives only general instructions.

A provider of navigation databases has utilized document 1 to generate a description of the takeoff procedure in the format of the ARINC 424 standard. This is the textual data represented in a block 2 illustrated by FIG. 1. In practice, these data are provided in a digital format, included in a text file for example. But they can also exist in paper form, by simply printing the file for example. The data represented in the block 2 are an example of data available in an off-the-shelf navigation database. These data are purely textual but comply with a very precise syntax. They are hard for a human being to understand, except with long experience, but perfectly suited to automatic processing, notably processing by computer systems. At the very most it is easy to understand that it is necessary to successively chain 6 legs of respective types CA, then CF, then FA, then CI, then CF and finally TF, and to understand that each of the 6 legs is assigned parameters suited to its type. It should be noted that the general nature of the instructions provided by the SIA is manifested in the navigation database by 3 floating legs out of 6, viz. CA, FA and CI, which do not have a trajectory tied to a fixed point on the ground. In the present case, this nevertheless corresponds to a proportion of 50% of floating legs for a takeoff procedure. And from one navigation database provider to another, the number, the type and the parametrization of the floating legs can vary, as illustrated subsequently by FIG. 2. It is this that mainly explains the geographical dispersion phenomenon. Never mind that, moreover, the precision with which an airplane is capable of following a floating leg varies with the meteorological conditions and with the type of airplane.

The industries which provide systems having to manage published procedures, like FMS, buy navigation databases in the ARINC 424 format as described in block 2. They firstly subject them to a preprocessing by a dedicated tool, a small computer utility for example, the sole aim of the preprocessing being to convert the data from the ARINC 424 format to specific data formats used by their systems. The converted data can for example be stored in a database 3 illustrated by FIG. 1. The data stored in the database 3 can subsequently be loaded directly into the memory of a system having to manage published procedures, like an FMS for example. An FMS implements notably an algorithm for chaining the legs, which firstly generates trajectory portions making it possible to chain the legs, then a complete trajectory for provision to guidance systems for example. In current onboard FMS, the algorithm for chaining the legs often covers the whole of the ARINC 424 standard, that is to say it implements the 360 permitted 2 by 2 combinations of the 23 legs of the ARINC 424 standard. Now, certain legs out of the 23 can be obtained by successive chainings of other legs out of the 23, the chainings in question corresponding to leg combinations implemented by the algorithm. In existing FMS, a certain redundancy is therefore apparent between the legs and the algorithm for chaining the legs.

In order notably to remedy this redundancy, a first possible step of a method according to the invention can for example be to determine a restricted family of legs from among the 23 ARINC 424 legs, it being possible to obtain the discarded legs of the family by successive chainings of the legs retained in the family, the chainings in question being permitted by the 360 combinations implemented by the algorithm. It should be noted that out of the legs retained, some can be obtained by successive chainings of other legs retained, the associated combinations not being implemented by the algorithm. Advantageously, in existing FMS, once the legs which can be discarded have been selected and deleted from the base of the legs, it is not necessary to modify the algorithm for processing the legs. Specifically, if it covered the 360 permitted combinations, it covers a fortiori the combinations of a restricted family of legs according to the invention. Advantageously, the legs which are not floating legs can be preferred in the restricted family of legs, so as to attenuate the geographical dispersion phenomenon as explained subsequently. For example, the first step of the method according to the invention may lead to a restricted family of 10 legs from among the 23 ARINC 424 legs, so that each of the 13 discarded legs can be obtained by successive chainings of the 10 legs retained, the associated combinations being among the combinations implemented by the algorithm. For example, the 10 legs may be IF, CF, DF, TF, RF, FA, HA, HF, HM and FM. Even if, at first sight, the solution of the invention may seem close to that of directive DO236B, in reality the solution of the invention stands apart therefrom through its very philosophy. Specifically, the solution proposed by directive DO236B obligates State organizations to modify certain published procedures so that they can be converted into a series of legs out of the 9 legs whose use it recommends, whereas the solution of the invention does not absolutely make it necessary to modify published procedures. Any currently published procedure can be translated into a series of legs from the family of 10 legs according to the invention, without any prior adaptation. In a way, the family of the 10 legs according to the invention forms a family "equivalent" to the family of the ARINC 424 legs. This philosophical difference explains in part that the family of legs according to the invention comprises more legs than the family of legs according to directive DO236B.

Reasoning by analogy, the set of ARINC 424 legs can be considered to be a vector space of finite dimension. The subset of the 9 DO236B legs and the subset of the 10 legs according to the invention constitute families of vectors of this space. The subset of the 9 DO236B legs does not generate the space of the ARINC 424 legs, since State organizations must reconsider certain procedures so that they can be translated into a chain of legs taken from the 9 DO236B legs. The subset of the 10 legs according to the invention is a subset that generates the space of the ARINC 424 legs, since any currently published procedure can henceforth be translated into a chain of legs taken from the subset of 10 legs according to the invention. However, it is not possible to conclude that one of the two families constitutes an independent subset and even less a basis of the space of the ARINC 424 legs. At the very most it may be noted that the subset of the 10 legs according to the invention contains the subset of the 9 DO236B legs, to which the leg FM is added. Therefore the leg FM appended by the invention is independent of the 9 DO236B legs, since its addition allows the subset to become generating. But nothing makes it possible to conclude that the subset of the 9 DO236B legs is an independent subset, at the very most it generates a sub-space of the space of the ARINC 424 legs, in which sub-space State organizations must redefine the procedures so that they are compatible with directive DO236B. For this reason, nothing makes it possible to conclude that the subset of the 10 legs according to the invention is a basis of the space of the ARINC 424 legs, only that the space of the ARINC 424 legs is of dimension less than or equal to 10. It should be noted that, having regard to the fact that a large number of arrival procedures are carried out by an outbound course before performing a U-turn to place themselves in line with the runway axis, the leg FM has been retained in the subset of legs according to the invention since it corresponds to this maneuvre.

Figure 2:
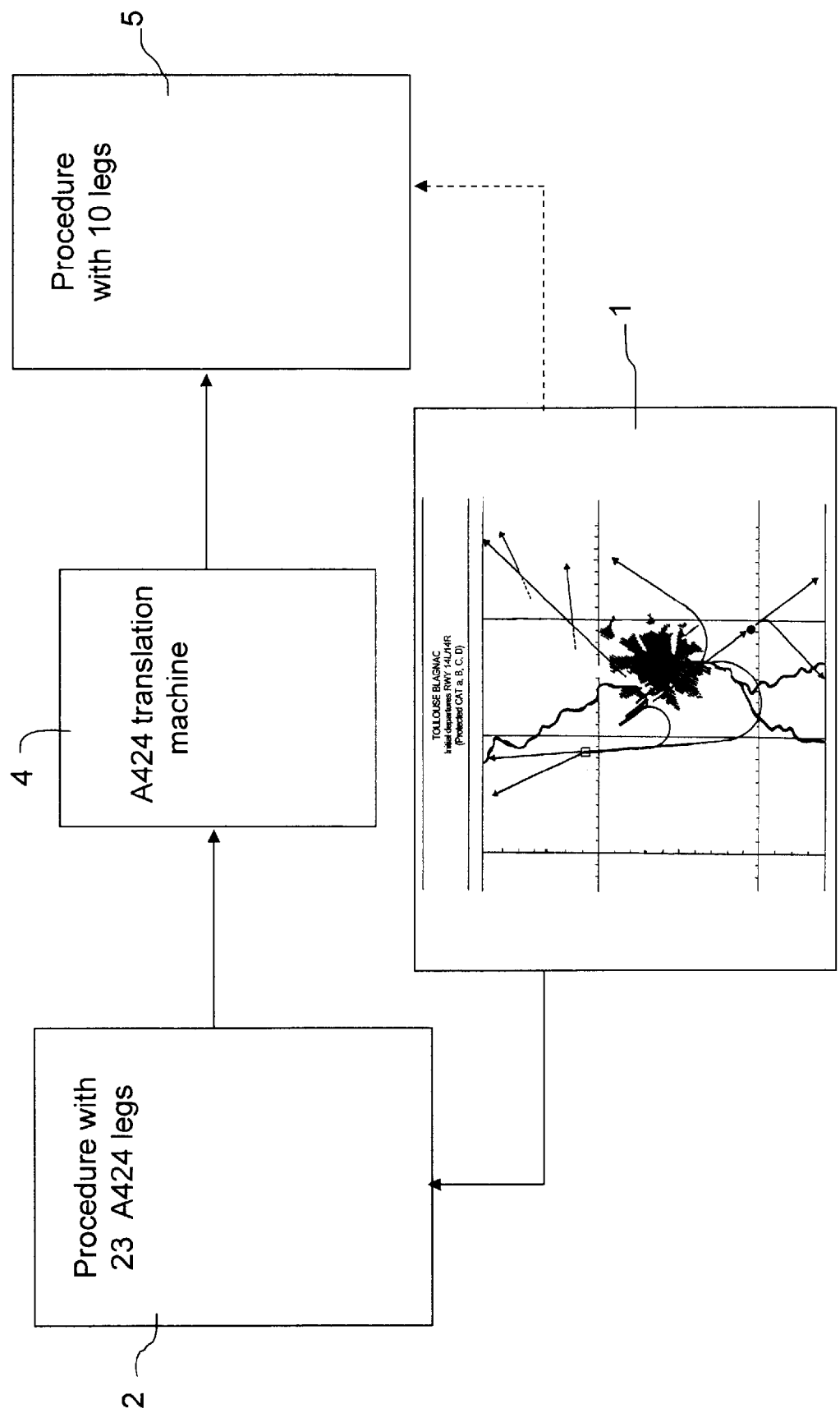
FIG. 2, by a chart, an exemplary implementation of the invention in the form of a translation machine.

FIG. 2 illustrates by a chart an exemplary implementation of a second possible step of the method according to the invention, in the form of a machine 4 for translating the ARINC 424 legs. Advantageously, the translation machine 4 can be the combination of hardware and software computing means. It may come within a ground process of aeronautical data preparation for traffic control, but it may also be integrated into an FMS aboard an aircraft. The same document 1 as that of FIG. 1 is represented in FIG. 2, providing a textual and graphical description of the same Toulouse-Blagnac takeoff procedure. The same block 2 as that of FIG. 1 is represented, providing a textual description of the takeoff procedure on the basis of the 23 legs of the ARINC 424 standard. To implement the second step, the translation machine 4 takes as input this textual description of the takeoff procedure on the basis of the 23 legs of the ARINC 424 standard. It provides as output in a block 5 a transformation of the takeoff procedure, so that the latter is still in textual form but that it is now described using only the 10 legs according to the invention. Examples illustrating the transformation processing performed by the translation machine 4 will be detailed subsequently by virtue of FIG. 3. Additionally, it should be noted that it may be envisioned that the restricted family of the 10 legs according to the invention is used directly by a database provider. In which case, the published procedure would be made directly available off-the-shelf in a textual form using only the 10 legs according to the invention.

Figure 3:
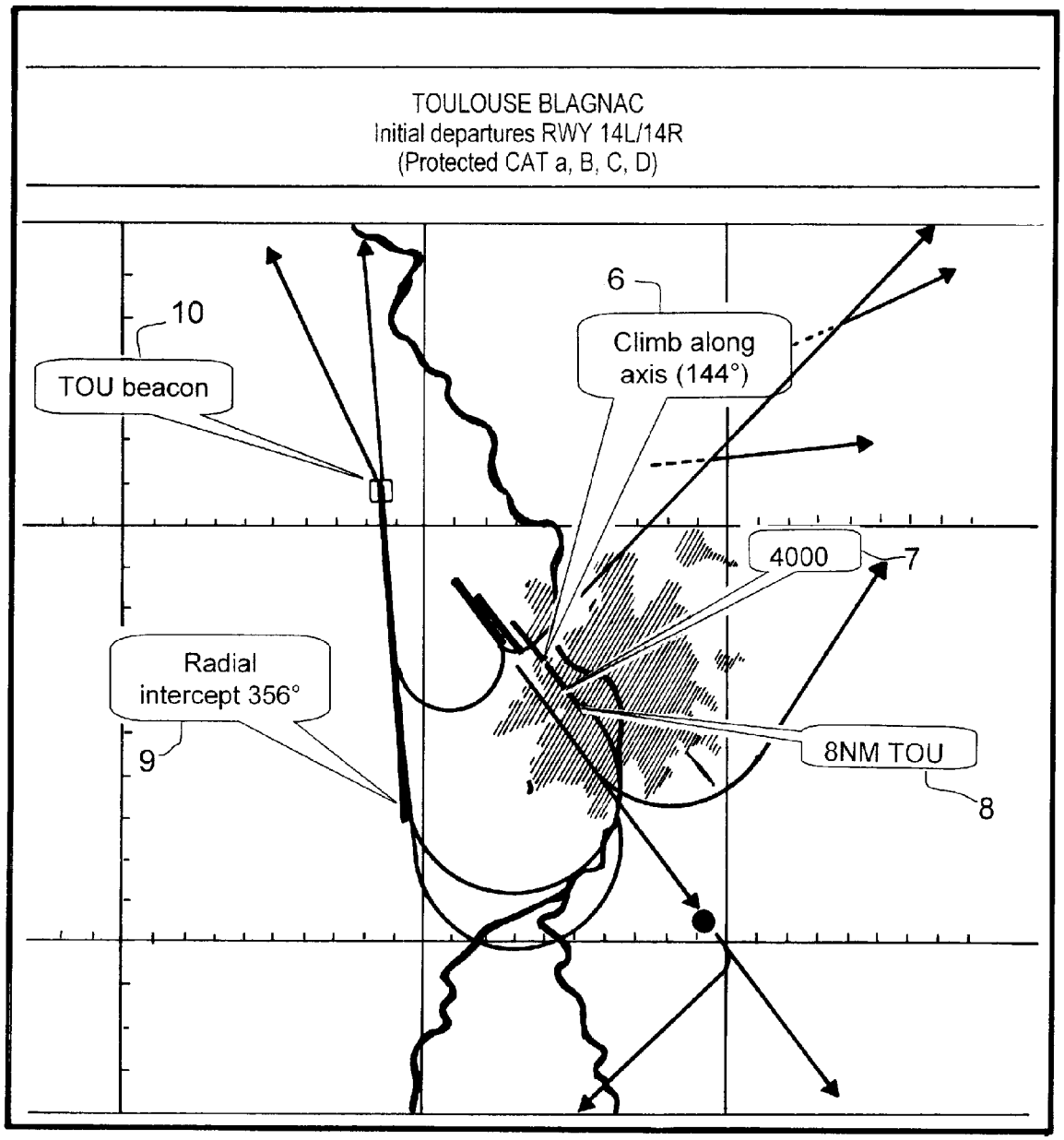
FIG. 3, an exemplary graphical description of a published takeoff procedure.

FIG. 3 illustrates in greater detail the graphical description published by the SIA of the Toulouse-Blagnac takeoff procedure. It makes it possible to specify the processing performed by the translation machine 4 within the framework of the second step of the method according to the invention. The graphical description is extracted from document 1 already represented in FIGS. 1 and 2. Textual labels have been added to the mapping, so as to better pinpoint the important steps of the takeoff procedure such as they are described textually by the SIA. It may be useful to recall these steps: "After takeoff, follow RDL144 (RM144) and climb to the assigned level. At 4000 AMSL minimum and not before 8 NM TOU, turn right to intercept and follow RDL176 (RM356) as far as TOU. At TOU, follow RDL356 (RM356) as far as FISTO (47NM TOU)". Thus, FIG. 3 gives in the direction of flight, the following textual labels which are references to these steps: a label 6 saying "Climb along the axis (144)", a label 7 saying "4000", a label 8 saying "8NM TOU", a label 9 saying "Radial intercept 356°" and a label 10 saying "TOU Beacon".

The takeoff procedure has been transformed by a navigation database provider in the following manner:
LFBO14R: departure point, runway threshold
1000: leg CA at 1000 feet, course 144°
TOU8Δ: leg CF, termination TOU8 with overflight of the point, course 144°
4000: leg CA, termination 4000 feet, course 144°
INTCPT: leg CI, intercepting the following leg on course 311°
TOU: leg CF, termination TOU, course 356°
FISTO: leg CF, termination FISTO, course 356°

First of all, it should be noted that this description which uses legs of the ARINC 424 format without restriction is not identical to the description given in the block 2 of the example of FIG. 1, though it involves the same takeoff procedure. Additionally, it contains 3 floating legs out of 6, thus clearly illustrating the geographical dispersion phenomenon. Finally, it is not compatible with directive DO236B since it contains 2 legs CA and 1 leg CI.

The first leg CA starting from the runway to climb to 1000 feet along the axis at 144 degrees can for example be replaced by the translation machine 4 according to the invention with a leg FA starting from the runway threshold to climb to 1000 feet along this same axis. The procedure then becomes:

LFBO14R: departure point, runway threshold
1000: leg FA at 1000 feet, origin LFBO14R, course 144°
TOU8Δ: leg CF, termination TOU8 with overflight of the point, course 144°
4000: leg CA, termination 4000 feet, course 144°
INTCPT: leg CI, intercepting the following leg on course 311°
TOU: leg CF, termination TOU, course 356°
FISTO: leg CF, termination FISTO, course 356°

In the same manner, the second leg CA can be replaced by the translation machine 4 according to the invention with a leg FA starting from TOU8 and making course at 144 degrees. The procedure then becomes:

LFBO14R: departure point, runway threshold
1000: leg FA at 1000 feet, origin LFBO14R, course 144°
TOU8Δ: leg CF, termination TOU8 with waypoint, course 144°
4000: leg FA at 4000 feet, origin TOU8, course 144°
INTCPT: leg CI, intercepting the following leg on course 311°
TOU: leg CF, termination TOU, course 356°
FISTO: leg CF, termination FISTO, course 356°

It should be noted that the second leg FA may be of zero length if the airplane is already above 4000 feet at TOU8. The chain of the legs CI and CF can be transformed by the translation machine 4 according to the invention into a chain of two legs CF. For this purpose the translation machine 4 calculates the coordinates of the point of interception of the radial at 356 degrees, illustrated in FIG. 3, by taking for example a roll angle of 15 degrees. At the intersection point, a waypoint TOUCF is created. The procedure then becomes:

LFBO14R: departure point, runway threshold
1000: leg FA at 1000 feet, origin LFBO14R, course 144°
TOU8Δ: leg CF, termination TOU8 with overflight of the point, course 144°
4000: leg FA at 4000 feet, origin TOU8, course 144°
TOUCF: leg CF, course 311°
TOU: leg CF, termination TOU, course 356°
FISTO: leg CF, termination FISTO, course 356°

The procedure thus transformed by the translation machine 4 according to the invention now contains only legs of the restricted family of 10 legs according to the invention. It should be noted that it now contains only two floating legs and above all that it contains only legs advocated by directive DO236B.

By restricting the family of legs, the translation machine 4 according to the invention decreases the number of possible combinations and simplifies their chaining logic. The complexity of trajectory calculation systems such as FMS is thereby markedly decreased, their validation simplified and their robustness increased. The phenomenon of geographical dispersion between these systems is also considerably attenuated. Specifically, out of the 10 legs of the restricted family of legs according to the invention, only the legs FA and FM are floating legs, all the others are fixed legs. However, the floating legs are the ones mainly responsible for the previously described phenomenon of geographical dispersion between different systems, since the floating legs allow these systems a great deal of latitude in generating leg chaining trajectories. By maximizing the proportion of fixed legs and by minimizing the proportion of floating legs, the translation machine 4 according to the invention thus enables the calculation of the trajectories representing the approach or takeoff procedures to be rendered more deterministic. This determinism enhances the reliability of the subsequent processing performed on the ground and in flight on these trajectories, processing aimed for example at verifying the separation between these trajectories or aimed at monitoring the airplanes along these trajectories. Thus, by abandoning 9 floating legs out of 11, the use of the restricted family of 10 legs according to the invention considerably attenuates the geographical dispersion phenomenon and improves the safety conditions during the critical phases, namely takeoff and landing.

The present invention gives a new orientation to work relating to improving the precision with which aircraft follow their trajectory with respect to the ground, this being one of the objectives of new standards such as the DO236B standard. Furthermore, by employing all 9 DO236B legs and by supplementing them with the leg FM, the invention ensures the compatibility of the systems which implement it with the current DO236B directive and very probably with its subsequent upgrades.

The invention claimed is:

1. A method for calculating a trajectory flow by an aircraft by changing a series of legs together in an air navigation procedure, said trajectory being initially defined by a series of legs, the legs forming part of an initial family of legs, said initial family of legs comprising at least one of
  a fixed leg, said fixed leg selected from the group consisting of initial fix (IF), course to a fix (CF), direct to a fix (DF), track between two fixes (TF), arc DME to a fix (AF), radius to a fix (RF), track from fix to distance (FC), and track from fix to DME distance (FD);
  a floating leg, said floating leg selected from the group consisting of heading to altitude (VA), course to altitude (CA), fix to altitude (FA), heading to intercept (VI), course to intercept (CI), heading to DME distance (VD), course to DME distance (CD), heading to radial (VR), course to radial (CR) head to manual (VM), and fix to manual (FM);
  a holding procedure leg, said holding procedure leg selected from the group consisting of hippodrome to manual termination (HM), hippodrome to altitude termination (HA), and hippodrome to fix termination (HF); or
  a course reversal leg, said course reversal leg consisting of fix to manual (PI),
    said method comprising the following steps:
    determining, via a processor, a restricted family of legs included in the initial family of legs, so that each leg not belonging to the restricted family corresponds to a combination of legs belonging to the restricted family, said restricted family comprising at most two floating legs; and
    replacing for calculation, via a processor, of said flown trajectory in the navigation procedure the legs not belonging to the restricted family with combinations of legs belonging to the restricted family.

2. The method according to claim 1, wherein the navigation procedure is a takeoff procedure or a landing procedure.

3. The method according to claim 1, wherein the restricted family of legs contains at most 10 legs.

4. The method according to claim 1, wherein the restricted family of legs contains the legs initial fix (IF), course to a fix (CF), direct to a fix (DF), track between to fixes (TF), arc DME to a fix (AF), radius to a fix (RF), fix to altitude (FA), hippodrome to altitude termination (HA), hippodrome to fix termination (HF), and hippodrome to manual termination (HM).

5. The method according to claim 1, wherein the restricted family of legs contains the legs initial fix (IF), course to a fix (CF), direct to a fix (DF), track between to fixes (TF), arc DME to a fix (AF), radius to a fix (RF), fix to altitude (FA), hippodrome to altitude termination (HA), hippodrome to fix termination (HF), hippodrome to manual termination (HM), and fix to manual (FM).

6. The method according to claim 1, wherein said method is implemented aboard an aircraft in the form of a translation machine in a flight management system.

7. The method according to claim 1, wherein the method is implemented on the ground in the form of a translation machine in a traffic management system.

8. The method according to claim 1, wherein the navigation procedure is a takeoff procedure or a landing procedure described by using the legs initial fix (IF), course to a fix (CF), direct to a fix (DF), track between to fixes (TF), arc DME to a fix (AF), radius to a fix (RF), track from fix to distance (FC), track from fix to DME distance (FD), hippodrome to altitude termination (HA), hippodrome to fix termination (HF), hippodrome to manual termination (HM) and fix to manual (PI) and at most two of heading to intercept (VI), course to intercept (CI), heading to altitude (VA), course to altitude (CA), fix to altitude (FA), heading to DME distance (VD), course to DME distance (CD), heading to radial (VR), course to radial (CR), head to manual (VM), fix to manual (FM) as said initial family of legs.

9. The method according to claim 3, wherein the restricted family of legs contains the legs initial fix (IF), course to a fix (CF), direct to a fix (DF), track between to fixes (TF), arc DME to a fix (AF), radius to a fix (RF), fix to altitude (FA), hippodrome to altitude termination (HA), hippodrome to fix termination (HF), and hippodrome to manual termination (HM).

10. The method according to claim 3, wherein the restricted family of legs contains the legs initial fix (IF), course to a fix (CF), direct to a fix (DF), track between to fixes (TF), arc DME to a fix (AF), radius to a fix (RF), fix to altitude (FA), hippodrome to altitude termination (HA), hippodrome to fix termination (HF), hippodrome to manual termination (HM), and fix to manual (FM).

11. The method according to claim 4, wherein the restricted family of legs contains the legs initial fix (IF), course to a fix (CF), direct to a fix (DF), track between to fixes (TF), arc DME to a fix (AF), radius to a fix (RF), fix to altitude (FA), hippodrome to altitude termination (HA), hippodrome to fix termination (HF), hippodrome to manual termination (HM), and fix to manual (FM).

12. The method according to claim 2, wherein said method is implemented aboard an aircraft in the form of a translation machine in a flight management system.

13. The method according to claim 3, wherein said method is implemented aboard an aircraft in the form of a translation machine in a flight management system.

14. The method according to claim 4, wherein said method is implemented aboard an aircraft in the form of a translation machine in a flight management system.

15. The method according to claim 5, wherein said method is implemented aboard an aircraft in the form of a translation machine in a flight management system.

16. The method according to claim 2, wherein the method is implemented on the ground in the form of a translation machine in a traffic management system.

17. The method according to claim 3, wherein the method is implemented on the ground in the form of a translation machine in a traffic management system.

* * * * *